Aug. 30, 1966 P. V. IVERSEN 3,270,252

APPARATUSES COMPRISING A TUNED CIRCUIT NETWORK

Filed Oct. 7, 1963

United States Patent Office 3,270,252
Patented August 30, 1966

3,270,252

APPARATUSES COMPRISING A TUNED CIRCUIT NETWORK

Peter Valdemar Iversen, Hareskoven, Denmark, assignor to Produktionsaktieselskabet Torotor, Copenhagen-Charlottenlund, Denmark, a corporation of Denmark
Filed Oct. 7, 1963, Ser. No. 314,322
Claims priority, application Great Britain, Oct. 8, 1962, 38,009/62
2 Claims. (Cl. 317—101)

The present invention relates to an apparatus for use as a shielded building block of a main electronic circuit.

It is an object of the present invention to provide an apparatus of the type referred to hereinabove in which a part of the exterior casing which provides the shielding can be easily removed to enable inspection and/or repair of the building block.

A further object of the present invention is to provide an apparatus of the type referred to hereinabove in which the exterior casing which provides the shielding is detachably assembled from a plurality of parts which can be assembled and separated without the use of tools, simply by pulling apart.

It is a still further object of the present invention to provide an apparatus of the type referred to hereinabove which is easily detachable as a whole from its connections in the main electronic circuit without the use of tools.

Still a further object of the present invention is to provide an apparatus of the type referred to hereinabove which can be stationarily assembled with the main electronic circuit by soldering, or the like.

Still a further object of the present invention is to provide an apparatus of the type referred to hereinabove in which a carrier member for a plurality of electronic circuit components is detachably arranged inside the exterior casing which provides the shielding, said carrier member being held in a fixed position by guiding means inside said casing.

Figure 1:
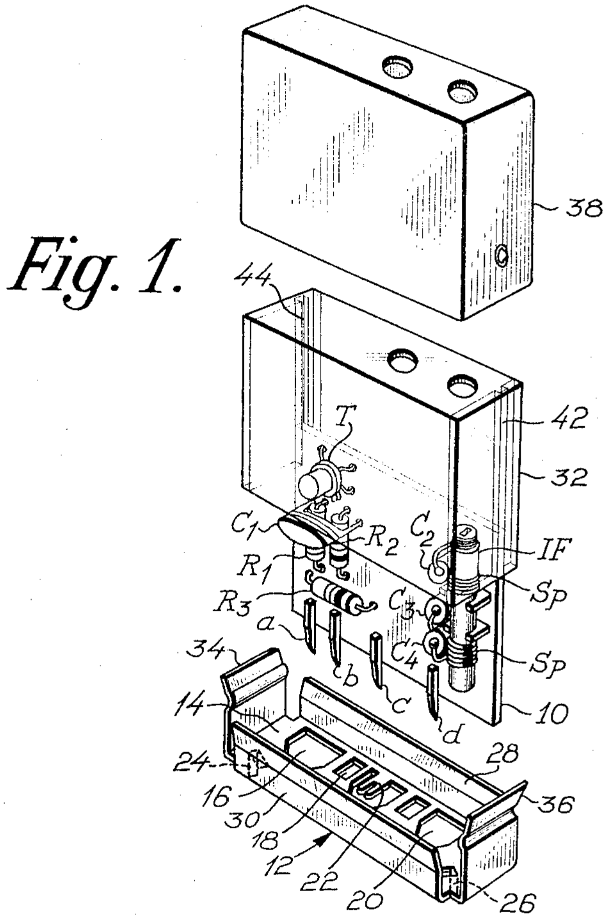
Figure 2:
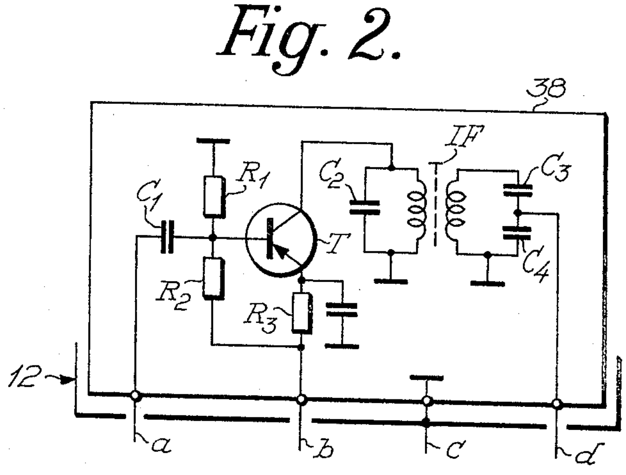

Further objects, features and advantages of the present invention will appear from the following specification in connection with the accompanying drawing in which:

FIG. 1 is an exploded view showing the mechanical structure of an apparatus according to the invention, and FIG. 2 is a diagrammatic illustration of the network included in the apparatus.

In brief terms with reference to the accompanying drawings the embodiment shown provides a shielded building block having a carrier member 10 which support a plurality of sub-circuit components $C_1$–$C_4$, $R_1$–$R_3$, T, IF. These components are electrically connected with each other and with terminals *a, b, c* and *d* mounted on and extending from one edge of the carrier member 10. The carrier member 10 is enclosed in an open-sided shielding structure 32, 38 and an electrically conducting supporting member 12 which is adapted to be detachably connected with the shielding structure 32, 38 as a closure member for its open side. The supporting member 12 is provided with a series of passages 16, 18, 20 and 22 for the terminals *a, b, c* and *d*.

More specifically with reference to FIG. 1 the components of the sub-circuit network are mounted on the carrier 10 having a printed circuit and having connector terminals *a, b, c* and *d* at one edge thereof adapted to be connected to the main network. To this purpose the terminals may be in the form of pins adapted to be received in holes of a main chassis plate for a complex network provided with a printed circuit so as to be electrically connected thereto, for example by soldering.

The circuit carrier 10 is vertically supported on a structure of electrically conductive material generally referred to by 12 having an end member 14 with apertures 16, 18 and 20 for the passage of the terminals *a*, *b*, and *d* therethrough, and means such as a flap 22 for providing electrical connection between the terminal *c* and the structure 12. In addition the bottom member 14 of the structure 12 is provided with flaps 24 and 26 adapted to be connected with the circuitry of the complex network so as to establish earthing of the metallic structure 12 as well as the terminal *c* connected therewith by means of the flap 22.

The structure 12 is provided with upwardly extending side walls 28 and 30 adapted to releasably receive a downwardly open insulating casing 32, which is provided with elongated slots 42, 44 engaged by opposite edges of the carrier plate 10 thus supporting the carrier laterally. Furthermore the structure 12 is provided with upwardly extending end wall members 34 and 36 adapted to receive a downwardly open metallic shield structure 38 which fits over the insulating casing 32.

In the diagrammatical illustration of FIG. 2 the terminal *a* is through a condenser $C_1$ connected with a voltage divider $R_1$, $R_2$ to the base of a transistor T the emitter of which through a resistance $R_3$ is connected to the terminal *b*.

The collector of the transistor T is connected with the primary circuit of an intermediate transformer IF which includes a condenser $C_2$ and in the secondary circuit of which two condensers $C_3$ and $C_4$ are provided and connected to the terminal *d*.

The terminal *c* is connected with the top end of the resistance $R_1$ and provides by means of its connection with the flap 18 of the structure 12 the earthing of this structure as well as the earthing of the shield 38 when mounted releasably in the structure 12.

In order to provide for good electrical contact between the end walls 34 and 36 and corresponding walls of the shield structure 38, the end walls 34 and 36 may be of elastic material and provided with suitable contact members (not shown).

As will be understood from the foregoing description the carrier 10 on which the components are supported and referred to by the same reference numerals as in the circuit arrangement of FIG. 2 provides together with the bottom structure 12 a unitary structure which as such can be connected with the main circuit and with which the shield structure as well as the insulating casing can be detachably connected.

The insulating casing 32 may be made from a suitable plastic material which for example may be cut from an extruded tubular member of rectangular configuration which is provided with a top closure member having a hole through which the transformer IF is accessible for tuning. In such event, the shield 38 is a completely upwardly closed structure. As will be understood, the insulating casing serves the purpose of electrically insulating the components and the printed circuit of the carrier 10 from the shield 38, whereby precision with respect to mounting of the carrier 10 and the necessity of providing so much space inside the shield 38, that danger of undesired short-circuiting is excluded, can be avoided.

As will be obvious from the foregoing the invention provides a unitary completely shielded auxiliary tuned circuit which is effectively insulated from the shield, and in which the shield is detachable for the purpose of inspecting the components which may be facilitated by making the structure 32 of transparent plastic material. In addition, the insulating structure 32 is also detachable to render the carrier 10 accessible for easy repair, such as replacement of a component.

The apparatus may, within the scope of the invention, be provided with means for releasably holding the members 12 and 38 together so as to allow detachment of the apparatus as a whole from the main circuit.

Apparatuses according to the invention may preferably be manufactured in standard sizes with respect to carrier 10, base structure 12 as well as insulating structure 32 and shield 38 capable of having mounted on the carrier 10 different components included in different types of auxiliary circuitry such as low-frequency amplifiers, modulators and other auxiliary circuitry used in radio and television sets whereby standardized apparatuses according to the invention are widely applicable in the radio and television industry.

It will be understood that the invention is not limited to the embodiment shown and described and that various modifications will be possible within the scope of the invention.

What I claim is:

1. In an apparatus for use as a shielded building block of a main electronic circuit in combination: a carrier having at least one edge, a plurality of electronic components, means supporting said components on said carrier, a plurality of terminals on said carrier extending from said one edge thereof, means for electrically connecting said components and said terminals to effectively provide a sub-circuit of said main circuit, an electrically conductive supporting member, an exterior housing structure of electrically conductive material having one open side and operable to enclose and shield said carrier with said components, an interior housing structure of electrically insulating material having an open side and arranged inside said conductive structure with said open sides coinciding, means for detachably connecting both of said housing structures with said supporting member to close the open sides of said housing structures by means of said supporting member and effect an electrical connection between said supporting member and said exterior housing structure, said supporting member having a plurality of apertures therein in alignment with said terminals, said terminals passing through said apertures to effectively provide plug pins extending from said building block, at least one of said terminals contacting said supporting member so as to provide an electrical connection between said supporting member and said sub-circuit.

2. In an apparatus for use as a shielded building block of a main electronic circuit in combination: a substantially flat carrier plate of insulating material having a plurality of edges, a plurality of electronic components, means supporting said components on said carrier plate, a plurality of terminals on said carrier plate extending from one edge thereof, means for electrically connecting said components and said terminals to effectively provide a sub-circuit of said main circuit, an electrically conductive supporting member, a shielding structure comprising an exterior open-sided shielding box and an interior insulating lining covering at least the sides of said box adjacent said open side, said structure being operable to enclose said carrier plate with said components, slots in opposite sides of said interior lining for receiving opposite edges of said carrier plate for positioning it inside said structure with said terminals extending through said open side, means for detachably connecting said structure with said supporting member to close the open side of said structure by means of said supporting member and effect an electrical connection between said supporting member and said shielding box, said supporting member having a plurality of apertures therein in position to provide passage for said terminals to effectively provide plug pins, at least one of said terminals contacting said supporting member so as to provide an electrical connection between said supporting member and said sub-circuit.

References Cited by the Examiner

UNITED STATES PATENTS

| | | | |
|---|---|---|---|
| 1,084,657 | 1/1914 | Nash | 174—52.5 |
| 2,682,018 | 6/1954 | Phillips | 317—101 |
| 2,764,713 | 8/1956 | Alden | 317—101 |

R. K. SCHAEFER, *Primary Examiner.*

JOHN F. BURNS, KATHLEEN H. CLAFFY, *Examiners.*

J. G. COBB, J. J. BOSCO, *Assistant Examiners.*